(12) United States Patent
Kotecha

(10) Patent No.: US 8,626,222 B2
(45) Date of Patent: *Jan. 7, 2014

(54) CHANNEL RANK UPDATES IN MULTIPLE-INPUT MULTIPLE-OUTPUT COMMUNICATION SYSTEMS

(75) Inventor: Jayesh H. Kotecha, Austin, TX (US)

(73) Assignee: Apple Inc., Cupertino, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 12/891,160

(22) Filed: Sep. 27, 2010

(65) Prior Publication Data

US 2011/0009148 A1    Jan. 13, 2011

Related U.S. Application Data

(63) Continuation of application No. 12/053,577, filed on Mar. 22, 2008, now Pat. No. 7,978,623.

(51) Int. Cl.
*H04J 3/14* (2006.01)

(52) U.S. Cl.
USPC ............ 455/513; 455/62; 455/63.1; 370/352; 370/336; 370/252; 370/253; 370/235; 370/230; 370/230.1; 370/231; 370/232; 370/233; 370/234; 370/328; 370/329; 370/343; 370/344

(58) Field of Classification Search
USPC ................. 370/352, 336, 252, 253, 235, 230, 370/230.1, 231, 232, 233, 234, 328, 329, 370/343, 344; 455/62, 63.1
See application file for complete search history.

(56) References Cited

U.S. PATENT DOCUMENTS

| | | | |
|---|---|---|---|
| 5,909,649 | A | 6/1999 | Saunders |
| 6,473,467 | B1 | 10/2002 | Wallace et al. |
| 6,968,092 | B1 | 11/2005 | Winger et al. |
| 7,050,759 | B2 | 5/2006 | Gaal et al. |
| 7,110,463 | B2 | 9/2006 | Wallace et al. |
| 7,139,328 | B2 | 11/2006 | Thomas et al. |
| 7,151,809 | B2 | 12/2006 | Ketchum et al. |
| 7,164,649 | B2 | 1/2007 | Walton et al. |

(Continued)

FOREIGN PATENT DOCUMENTS

| | | |
|---|---|---|
| EP | 1453262 | 1/2004 |
| EP | 1508992 | 2/2005 |

(Continued)

OTHER PUBLICATIONS

Wei et al., "Tackling MIMO-OFDMA Feedback Load Through Feedback Encoding," IEEE Wireless Communication Systems, pp. 363-367 (Sep. 6-8, 2009).

(Continued)

*Primary Examiner* — Bobbak Safaipour
(74) *Attorney, Agent, or Firm* — Paradigm IP Law, PC; Ross L. Franks

(57) ABSTRACT

Embodiments of the disclosure provide a system and method for providing channel feedback information (CFI) from a user equipment device to a base station. CFI is transmitted from the user equipment device on first and second communication channels. The user equipment device is operable to measure the channel rank of a downlink channel and to select a preferred channel rank that is used to configure the CFI that is transmitted to the base station. The base station is operable to use the preferred channel rank to interpret the CFI transmitted by the user end device.

31 Claims, 6 Drawing Sheets

(56) References Cited

U.S. PATENT DOCUMENTS

| | | | |
|---|---|---|---|
| 7,283,997 B1* | 10/2007 | Howard et al. | 1/1 |
| 7,426,176 B2 | 9/2008 | Liu et al. | |
| 7,505,527 B2 | 3/2009 | Hwang | |
| 7,551,898 B2 | 6/2009 | Gaal et al. | |
| 7,602,837 B2 | 10/2009 | Kotecha et al. | |
| 7,607,832 B2 | 10/2009 | Jensen et al. | |
| 7,649,831 B2 | 1/2010 | Van Rensburg et al. | |
| 7,702,029 B2 | 4/2010 | Kotecha et al. | |
| 7,751,368 B2 | 7/2010 | Li et al. | |
| 7,809,074 B2 | 10/2010 | Kotecha et al. | |
| 7,813,455 B2 | 10/2010 | Kotecha | |
| 7,978,623 B1* | 7/2011 | Kotecha | 370/252 |
| 8,233,939 B2* | 7/2012 | Li et al. | 455/561 |
| 8,295,778 B2* | 10/2012 | Kotecha et al. | 455/69 |
| 8,417,190 B2* | 4/2013 | Sun et al. | 455/67.13 |
| 2002/0163695 A1 | 11/2002 | Unitt et al. | |
| 2003/0153272 A1 | 8/2003 | Takano | |
| 2004/0066761 A1 | 4/2004 | Giannakis | |
| 2004/0076224 A1 | 4/2004 | Onggosanusi et al. | |
| 2004/0108944 A1 | 6/2004 | Lee et al. | |
| 2004/0190482 A1 | 9/2004 | Baum et al. | |
| 2004/0228423 A1 | 11/2004 | Gueguen | |
| 2005/0009476 A1 | 1/2005 | Wu et al. | |
| 2005/0013303 A1 | 1/2005 | Gopalakrishnan et al. | |
| 2005/0043031 A1 | 2/2005 | Cho et al. | |
| 2005/0063331 A1 | 3/2005 | Kim et al. | |
| 2005/0101259 A1 | 5/2005 | Tong | |
| 2005/0117660 A1 | 6/2005 | Vialle | |
| 2005/0129137 A1 | 6/2005 | Yamada et al. | |
| 2005/0135324 A1 | 6/2005 | Kim et al. | |
| 2005/0143084 A1 | 6/2005 | Cheng et al. | |
| 2005/0181739 A1 | 8/2005 | Krasny et al. | |
| 2005/0201296 A1 | 9/2005 | Vannithamby et al. | |
| 2005/0276317 A1 | 12/2005 | Jeong et al. | |
| 2006/0041816 A1 | 2/2006 | Hong et al. | |
| 2006/0072677 A1 | 4/2006 | Kwak et al. | |
| 2006/0092054 A1 | 5/2006 | Li et al. | |
| 2006/0093065 A1 | 5/2006 | Thomas et al. | |
| 2006/0098760 A1 | 5/2006 | Shen et al. | |
| 2006/0111100 A1 | 5/2006 | Murata et al. | |
| 2006/0120478 A1 | 6/2006 | Kim et al. | |
| 2006/0121946 A1 | 6/2006 | Walton et al. | |
| 2006/0155534 A1 | 7/2006 | Lin et al. | |
| 2006/0155798 A1 | 7/2006 | Ketchum et al. | |
| 2006/0205437 A1 | 9/2006 | Sung et al. | |
| 2006/0209980 A1 | 9/2006 | Kim et al. | |
| 2006/0239377 A1 | 10/2006 | McCoy et al. | |
| 2006/0246939 A1 | 11/2006 | Zeller et al. | |
| 2006/0279460 A1 | 12/2006 | Yun et al. | |
| 2007/0010268 A1 | 1/2007 | Kim et al. | |
| 2007/0024780 A1 | 2/2007 | Kim et al. | |
| 2007/0026808 A1 | 2/2007 | Love et al. | |
| 2007/0064665 A1 | 3/2007 | Zhang et al. | |
| 2007/0066571 A1 | 3/2007 | Stockel et al. | |
| 2007/0070967 A1 | 3/2007 | Yang et al. | |
| 2007/0086540 A1 | 4/2007 | Chae et al. | |
| 2007/0098106 A1 | 5/2007 | Khojastepour et al. | |
| 2007/0099571 A1 | 5/2007 | Withers et al. | |
| 2007/0121543 A1 | 5/2007 | Kuchibhotla et al. | |
| 2007/0123254 A1 | 5/2007 | Choi et al. | |
| 2007/0127608 A1 | 6/2007 | Scheim et al. | |
| 2007/0147535 A1 | 6/2007 | Niu | |
| 2007/0165731 A1 | 7/2007 | Xiao et al. | |
| 2007/0191066 A1 | 8/2007 | Khojastepour et al. | |
| 2007/0195974 A1 | 8/2007 | Li et al. | |
| 2007/0206545 A1 | 9/2007 | Lee et al. | |
| 2007/0211813 A1 | 9/2007 | Talwar et al. | |
| 2007/0218910 A1 | 9/2007 | Hill et al. | |
| 2007/0223619 A1 | 9/2007 | Lee et al. | |
| 2007/0249296 A1 | 10/2007 | Howard et al. | |
| 2007/0258392 A1 | 11/2007 | Larsson et al. | |
| 2007/0286304 A1 | 12/2007 | Kim et al. | |
| 2007/0297528 A1 | 12/2007 | Feder | |
| 2008/0008110 A1 | 1/2008 | Kishigami et al. | |
| 2008/0009322 A1 | 1/2008 | Kim | |
| 2008/0013610 A1 | 1/2008 | Varadarajan et al. | |
| 2008/0037464 A1 | 2/2008 | Lim et al. | |
| 2008/0045143 A1 | 2/2008 | Yoshida et al. | |
| 2008/0056414 A1 | 3/2008 | Kim et al. | |
| 2008/0069031 A1* | 3/2008 | Zhang et al. | 370/328 |
| 2008/0075058 A1 | 3/2008 | Mundarath et al. | |
| 2008/0076370 A1 | 3/2008 | Kotecha et al. | |
| 2008/0080448 A1 | 4/2008 | Rottinghaus | |
| 2008/0080449 A1 | 4/2008 | Huang et al. | |
| 2008/0080459 A1* | 4/2008 | Kotecha et al. | 370/342 |
| 2008/0095110 A1 | 4/2008 | Montojo et al. | |
| 2008/0102846 A1 | 5/2008 | Kim et al. | |
| 2008/0117815 A1* | 5/2008 | Kim et al. | 370/230 |
| 2008/0118008 A1 | 5/2008 | Kotecha | |
| 2008/0130610 A1 | 6/2008 | Karlsson | |
| 2008/0159425 A1 | 7/2008 | Khojastepour et al. | |
| 2008/0165875 A1 | 7/2008 | Mundarath et al. | |
| 2008/0187062 A1 | 8/2008 | Pan et al. | |
| 2008/0212701 A1 | 9/2008 | Pan et al. | |
| 2008/0212702 A1 | 9/2008 | Pan et al. | |
| 2008/0225792 A1* | 9/2008 | Naguib et al. | 370/330 |
| 2008/0227495 A1 | 9/2008 | Kotecha et al. | |
| 2008/0229177 A1* | 9/2008 | Kotecha | 714/776 |
| 2008/0268785 A1 | 10/2008 | McCoy et al. | |
| 2008/0285477 A1 | 11/2008 | Kuroda et al. | |
| 2009/0016312 A1 | 1/2009 | Tao et al. | |
| 2009/0034480 A1 | 2/2009 | Levin et al. | |
| 2009/0034636 A1 | 2/2009 | Kotecha et al. | |
| 2009/0059844 A1 | 3/2009 | Ko et al. | |
| 2009/0067391 A1* | 3/2009 | Shen et al. | 370/336 |
| 2009/0075596 A1 | 3/2009 | Gorokhov et al. | |
| 2009/0086648 A1 | 4/2009 | Xu et al. | |
| 2009/0104901 A1 | 4/2009 | Baker et al. | |
| 2009/0154588 A1* | 6/2009 | Chen et al. | 375/267 |
| 2009/0163142 A1 | 6/2009 | Pi et al. | |
| 2009/0170437 A1 | 7/2009 | Bhattad et al. | |
| 2009/0181691 A1* | 7/2009 | Kotecha et al. | 455/452.1 |
| 2009/0190688 A1 | 7/2009 | Kotecha et al. | |
| 2009/0201861 A1* | 8/2009 | Kotecha | 370/329 |
| 2009/0245212 A1 | 10/2009 | Sambhwani et al. | |
| 2009/0257356 A1 | 10/2009 | Frederiksen et al. | |
| 2009/0304109 A1 | 12/2009 | Kotecha | |
| 2010/0018308 A1 | 1/2010 | Liimatta et al. | |
| 2010/0039953 A1 | 2/2010 | Zhang | |
| 2010/0074131 A1 | 3/2010 | Onggosanusi et al. | |
| 2010/0091680 A1 | 4/2010 | Chun et al. | |
| 2010/0097949 A1 | 4/2010 | Ko et al. | |
| 2010/0110982 A1 | 5/2010 | Roh et al. | |
| 2010/0172316 A1* | 7/2010 | Hwang et al. | 370/330 |
| 2010/0183086 A1 | 7/2010 | Ko et al. | |
| 2010/0304691 A1* | 12/2010 | Goransson et al. | 455/69 |
| 2010/0315969 A1* | 12/2010 | Jongren et al. | 370/252 |
| 2011/0080965 A1* | 4/2011 | Liu et al. | 375/260 |
| 2012/0076033 A1* | 3/2012 | Mundarath et al. | 370/252 |
| 2012/0120823 A1* | 5/2012 | Kotecha | 370/252 |
| 2013/0044714 A1* | 2/2013 | Kotecha et al. | 370/329 |

FOREIGN PATENT DOCUMENTS

| | | |
|---|---|---|
| JP | 2002232334 | 8/2002 |
| KR | 1020050041643 | 5/2005 |
| WO | 0176110 | 10/2001 |
| WO | 2004049613 | 6/2004 |
| WO | 2006020339 | 2/2006 |
| WO | 2007044173 | 4/2007 |

OTHER PUBLICATIONS

Kim et al., U.S. Appl. No. 60/841,246, filed Aug. 31, 2006.

3rd Generation Partnership Project; Technical Specification Group Radio Access Network; Evolved Universal Terrestrial Radio Access (E-UTRA); Physical Channels and Modulation (Release 8), v8.1.0 (Nov. 2007).

3rd Generation Partnership Project; Technical Specification Group Radio Access Network; Evolved Universal Terrestrial Radio Access (E-UTRA); Multiplexing and Channel Coding (Release 8), v8.1.0 (Nov. 2007).

(56) References Cited

OTHER PUBLICATIONS

3rd Generation Partnership Project; Technical Specification Group Radio Access Network; Evolved Universal Terrestrial Radio Access (E-UTRA); Physical Layer Procedures (Release 8), v8.1.0 (Nov. 2007).

3rd Generation Partnership Project; Technical Specification Group Radio Access Network; Evolved Universal Terrestrial Radio Access (E-UTRA); Physical Layer—Measurements (Release 8), v8.1.0 (Nov. 2007).

3GPP TSG RAN WG1, Proposed way forward on ACK/NACK channelization, Meeting #50bis, R1-074491, Shanghai, China, Oct. 8-12, 2007.

H. Hourani, "An Overview of Adaptive Antenna Systems," S-72.333 Postgraduate Course in Radio Communications (2004/2005), http://www.comlab.hut filopetus/333/2004.sub,—2005.sub.—slides/Adaptive.—sub.—antennastext.pdf.

U.S. Appl. No. 11/830,4589, filed Jun. 30, 2007, Office Action dated Jul. 15, 2010.

U.S. Appl. No. 11/830,4589, filed Jul. 30, 2007, Response to Office Action mailed Jan. 18, 2011.

International Search Report and Written Opinion for PCT/SU2008/061704, dated Oct. 15, 2008.

U.S. Appl. No. 11/742,204, filed Apr. 30, 2007, Office Action dated Jul. 2, 2009.

U.S. Appl. No. 11/742,204, filed Apr. 30, 2007, Response mailed Dec. 2, 2009.

U.S. Appl. No. 11/742,204, filed Apr. 30, 2007, Office Action dated Feb. 23, 2010.

U.S. Appl. No. 11/742,204, filed Apr. 30, 2007, Response mailed May 27, 2010.

U.S. Appl. No. 11/742,204, filed Apr. 30, 2007, Final Office Action mailed Aug. 9, 2010.

Analysis on DCT based CQI Reporting Scheme, 3GPP TSG RAN WG1 #46-bis, R1-062954, Seoul, Republic of Korea, Oct. 9-13, 2006.

International Search Report and Written Opinion for PCT Patent Application No. PCT/US2008/056579 dated Jul. 31, 2008.

Soo-Yong Jeon et al., Channel Adaptive CQI Reporting Schemes for HSDPA Systems, Communications Letter, IEEE, vol. 10, Issue 6, Jun. 2006, pp. 459-461.

U.S. Appl. No. 11/687,376, filed Mar. 16, 2007, Office Action dated Aug. 10, 2010.

Google Search, CQI First Second Subset Channel, Aug. 3, 2010.

N. Jindal, "Finite Rate Feedback MIMO Broadcast Channels," Feb. 2006 ita.ucsd.edu/workshop/06/talks/papers/79.pdf.

U.S. Appl. No. 11/620,203, filed Jan. 5, 2007, Office Action mailed Feb. 28, 2010.

U.S. Appl. No. 11/620,203, filed Jan. 5, 2007, Response filed Apr. 14, 2010.

U.S. Appl. No. 11/620,203, filed Jan. 5, 2007, Office Action mailed Sep. 30, 2010.

B. Hassibi, "An Efficient Square-Root Algorithm for BLAST," Proceedings of the 2000 IEEE International Conference on Acoustics, Speech and Signal Processing, Jan. 27, 2000.

U.S. Appl. No. 11/562,557, filed Nov. 22, 2006, Office Action mailed Oct. 15, 2009.

U.S. Appl. No. 11/562,557, filed Nov. 22, 2006, Response to Office Action mailed Mar. 15, 2010.

U.S. Appl. No. 11/562,557, filed Nov. 22, 2006, Notice of Allowance mailed Jun. 4, 2010.

A. Goldmsmith et al, "Variable-Rate Variable-Power MQAM for Fading Channels," IEEE Transactions on Communications, vol. 45, No. 10, Oct. 1997.

D. Love, "Limited Feedback Unitary Precoding for Spatial Multiplexing Systems," IEEE Transactions on Information Theory, vol. 51, No. 8, Aug. 2005.

A. Goldsmith, "The Capacity of Downlink Fading Channels with Variable Rate and Power," IEEE Transactions on Vehicular Technology, vol. 46, No. 3, Aug. 1997.

K. Huang et al., "Effect of Feedback Delay on Limited Feedback for Temporally Correlated Channels," Jul. 2006.

K. Huang et al., "Joint Beamforming and Scheduling for SDMA Systems with Limited Feedback," Jun. 2006.

K. Huang et al., "Limited Feedback for Temporally-Correlated Channels—Feedback Rate and Delay," Mar. or Jun. 2006.

K. Huang et al., "Markov models for multi-antenna limited feedback systems," Jun. 2006.

K. Huang et al., "Multi-Antenna Limited Feedback for Temporally-Correlated Channels Feedback Compression," Jul. 2006.

K. Huang et al., "Orthogonal Beamforming in SDMA Downlink with Limited Feedback," Jul. 2006.

D. Love et al., "Feedback Methods for Multiple-Input Multiple-Output Wireless Systems," 2004.

P. Chow, "A Practical Discrete Multitone Transceiver Loading Algorithm for Data Transmission over Spectrally Shaped Channels," IEEE Transactions on Communications, vol. 43, No. 2/3/4, Feb./Mar./Apr. 1995.

R. Fischer et al., "A New Loading Algorithm for Discrete Multitone Transmission," Global Telecommunications Conference, GLOBECOM, 1996.

P. Xia et al., "Multiantenna Adaptive Modulation with Beamforming Based on Bandwidth-Constrained Feedback," IEEE Transactions on Communications, vol. 53, No. 3, Mar. 2005.

U.S. Appl. No. 11/536,280, filed Sep. 28, 2006, Office Action mailed Apr. 30, 2009.

U.S. Appl. No. 11/536,280, filed Sep. 28, 2006, Response filed Jul. 30, 2009.

U.S. Appl. No. 11/536,280, filed Sep. 28, 2006, Office Action mailed Nov. 5, 2009.

U.S. Appl. No. 11/536,280, filed Sep. 28, 2006, Response filed Feb. 5, 2010.

U.S. Appl. No. 11/536,280, filed Sep. 28, 2006, Office Action mailed Apr. 27, 2010.

U.S. Appl. No. 11/536,280, filed Sep. 28, 2006, Pre-Appeal Brief filed Jul. 27, 2010.

U.S. Appl. No. 11/536,280, filed Sep. 28, 2006, Notice of Panel Decision mailed Aug. 19, 2010.

U.S. Appl. No. 11/536,280, filed Sep. 28, 2006, Notice of Allowance mailed Aug. 30, 2010.

U.S. Appl. No. 11/536,280, filed Sep. 28, 2006, Request for Continued Examination filed Nov. 30, 2010.

A. Bourdoux et al, "Joint TX-RX Optimisation for MIMO-SDMA Based on a Null-space Constraint," IEEE Vehicular Technology Conference, vol. 1, 2002.

K. Wong et al, "Performance Enhancement of Multiuser MIMO Wireless Communication Systems," IEEE Transactions on Communications, vol. 50, No, 12, Dec. 2002.

U.S. Appl. No. 11/535,702, filed Sep. 27, 2006, Office Action mailed Oct. 28, 2009.

U.S. Appl. No. 11/535,702, filed Sep. 27, 2006, Response dated Jan. 28, 2010.

U.S. Appl. No. 11/535,702, filed Sep. 27, 2006, Office Action dated May 11, 2010.

U.S. Appl. No. 11/535,702, filed Sep. 27, 2006, Response mailed Aug. 11, 2010.

U.S. Appl. No. 11/535,702, filed Sep, 27, 2006, Final Office Action dated Oct. 27, 2010.

S.V. Bana et al., "Space Division Multiple Access (SDMA) for Robust Ad hoc Vehicle Communication Networks," The IEEE Fourth International Conference on Intelligent Transportation Systems, 2001 IEEE Intelligent Transportation Systems.

D.J. Love et al, "Grassmannian Beamforming on Correlated MIMO Channels," IEEE Global Telecommunications Conference, Nov. 3-Dec. 3, 2004.

A. Bourdoux et al., "Joint TX-RX Optimisation for MIMO-SDMA Based on a Null-space Constraint," 2002 IEEE 56th Vehicular Technology Conference.

D.J. Love et al., "Grassmannian Beamforming for Multiple-Input Multiple-Output Wireless Systems," IEEE, 2003.

A.F. Naguib et al, Performance of Wireless CDMA with M-ary Orthogonal Modulation and Cell Site Antenna Arrays, IEEE, Journal on Selected Areas in Communications, vol. 14, No. 9, Dec. 1996.

(56) References Cited

OTHER PUBLICATIONS

L. Dong et al., "Opportunistic Transmission Scheduling for Multiuser MIMO Systems," IEEE, 2003.
H. Shin et al., "Closed-form Formulas for Ergodic Capacity of MIMO Rayleigh Fading Channels," IEEE, 2003.
M. Torlak et al., "Fast Estimation of Weight Vectors to Optimize Multi-Transmitter Broadcast Channel Capacity," IEEE Transactions on Signal Processing, vol. 46, No. 1, Jan. 1998.
V. Zaharov et al., "Smart Antenna Application for Satellite Communication Systems with Space Division Multiple Access," Journal of Radio Electronics, N. 2, Feb. 5, 2001, printed Oct. 18, 2005.
M. Cooper et al., "Intelligent Antennas: Spatial Division Multiple Access," 1996 Annual Review of Communications.
G.J. Foschini et al., On Limits of Wireless Communication in a Fading Environment when Using Multiple Antennas, Wireless Personal Communications, vol. 6, 1998, pp. 311-335, http://www1.bell-labs.com/project/blast/wpc-v6n3.pdf.
R. Monzingo et al., Introduction to Adaptive Arrays, Chapter 3, John Wiley & Sons, 1980, pp. 78-151.
U.S. Appl. No. 11/254,392, filed Oct. 20, 2005, Notice of Allowance mailed Sep. 18, 2008.
U.S. Appl. No. 11/254,392, filed Oct. 20, 2005, RCE IDS filed Dec. 16, 2008.
U.S. Appl. No. 11/254,392, filed Oct. 20, 2005, Notice of Allowance mailed Jan. 5, 2009.
U.S. Appl. No. 11/254,392, filed Oct. 20, 2005, RCE Amendment filed May 6, 2009.
U.S. Appl. No. 11/254,392, filed Oct. 20, 2005, Notice of Allowance mailed Jun. 4, 2009.
U.S. Appl. No. 12/419,701, filed Apr. 7, 2009, Preliminary Amendment mailed Apr. 7, 2009.
V. Hassel et al., "Exploiting Multiuser Diversity Using Multiple Feedback Thresholds," In Proc. IEEE Vehicular Technology Conference (VTC'05-spring), Stockholm, Sweden (May 2005).
B.C. Banister et al., "A Simple Gradient Sign Algorithm for Transmit Antenna Weight Adaptation with Feedback," IEEE Transactions on Signal Processing, vol. 51, No. 5, (May 2003).
D. Gesbert et al., "How Much Feedback is Multi-User Diversity Really Worth?" IEEE International Conference on Communications, Paris, France (Jun. 20-24, 2004).
V. Hassel et al., "A Threshold-Based Feedback Algorithm for Exploiting Multiuser Diversity," Dec. 21, 2005.
V. Hassel et al., "Exploiting Multiuser Diversity Using Multiple Feedback Thresholds," 2005 http://www.tele.ntnu.no/projects/cuban/.
K. Huang et al., "Effect of Feedback Delay on Multi-Antenna Limited Feedback for Temporally-Correlated Channels," Proceedings of IEEE Globecom 2006, (Nov. 27-Dec. 1, 2006).
K. Huang et al., "Joint Beamforming and Scheduling for SDMA Systems with Limited Feedback," Jun. 29, 2006 (http://aps.arxiv.org/PS.sub.—cache/cs/pdf/0606/0606121v2.pdf).
K. Huang et al., "Limited Feedback for Temporally-Correlated Channels: Feedback Rate and Delay," Jun. 6, 2006 (http://arxiv.org/PS.sub.—cache/cs/pdf/0606/0606022v1.pdf).
K. Huang et al., "Markov Models for Limited Feedback MIMO Systems," Proceedings of IEEE ICASSP, May 2006 (http://users.ece.sub.—utexas.edu/—khuang/Papers/ICASSP06.sub.—Markov.—pdf).
K. Huang et al., "Multi-Antenna Limited Feedback for Temporally-Correlated Channels: Feedback Compression," Proceedings of IEEE Globecom 2006, Nov. 27-Dec. 1, 2006 (http://www.ece.utexas.edu/.about.khuang/Papers/Globecom06.sub.—FbCmp.pd—f).
K. Huang et al., "Orthogonal Beamforming in SDMA Downlink with Limited Feedback," IEEE Intl. Conf. on Acoustics, Speech, and Signal Proc. (ICASSP) (May 2007) (http://users.ece.utexas.edu/.about.khuang/Papers/D200609.sub.—ICASSP.su-b.—SDMA.pdf).
J.C. Roh et al., "An Efficient Feedback Method for MIMO Systems with Slowly Time-Varying Channels," Wireless Communications and Networking Conference, vol. 2, Issue 21-25 pp. 760-764 (Mar. 2004).

T. Tang et al., "Opportunistic Feedback for Multiuser MIMO Systems with Linear Receivers," IEEE Transactions on Communications, vol. 55, No. 5, pp. 1020-1032, May 2007.
"Frequency Domain Adaptive Precoding for E-UTRA MIMO," 3GPP TSG RAN WG1, Seoul, South Korea, Oct. 9-13, 2006.
International Search Report for PCT Application No. PCT/US08/69059, mailed Nov. 14, 2018.
U.S. Appl. No. 11/833,669, filed Aug. 3, 2007, Office Action dated Aug. 12, 2010.
U.S. Appl. No. 11/833,669, filed Aug. 3, 2007, Response to Office Action mailed Nov. 16, 2010.
"Extending Codeword to Layer Mapping for Efficient Support of Retransmissions" (R1-073735) 3GPP TSG-RAN WG1 #50, Athens, Greece, Aug. 20-24, 2007.
Notes from offline discussions on PDCCH contents, Agenda Item 7.2.3, TSG-RAN WG1 #50 (R1-073870) Athens, Greece, Aug. 20-24, 2007.
"3rd Generation Partnership Project; Technical Specification Group Radio Access Network; Evolved Universal Terrestrial Radio Access (E-UTRA); Physical Channels and Modulation (Release 8)" 3GPP TS 36.211 v1.3.2 (2007).
D.J. Love et al, Multimode Precoding for MIMO Wireless Systems, IEEE Transactions on Signal Processing, vol. 53, No. 10, Oct. 2005.
International Search Report and Written Opinion for Application No. PCT/US2008/072111, dated Nov. 8, 2008.
Rohde & Schwarz, "UMTS Long Term Evolution (LTE) Technology Introduction," http://www.rohde-schwarz.com/www/downcent.nsf/ANFileByANNoForInternet/296-05894CA22C0A7C125729E003B5BF6/$fiprinted Apr. 30, 2007.
A. Jette et al., "IEEE 802.20 Working Group on Mobile Broadband Wireless Access," Technical Overview Presentation, Motorola, Jul. 20, 2001.
I. Wong et al., "Optimal Resource Allocation in Uplink SC-FDMA Systems," IEEE Transactions on Wireless Communications, http://users.ece.utexas.edu/.about.iwong/Scfdma.htm, Dec. 7, 2006.
"Data-non-associated L1/L2 Control Channel Structure for E-UTRA Uplink," 3GPP TSG RAN WG1 Meeting #46bis, R1-062741, Seoul, Korea Oct. 9-13, 2006.
International Search Report and Written Opinion for PCT Patent Application No. PCT/US2008/061218 dated Aug. 14, 2008.
Soo-Toung Jeon et al., Channel Adaptive CQ1 Reporting Schemes for UMTS High-Speed Downlink Packet Access; In: Vehicular Technology Conference, 2006, VTS-2006 Fall, IEEE 64th, Sep. 2006, pp. 1-5.
Soo-Toung Jeon et al., An Enhanced Channel-Quality (CQI) Reporting Scheme for HSDPA Systems, In: Communications Letters, IEEE May 2005, vol. 9, pp. 432-434.
U.S. Appl. No. 11/742,280, filed Apr. 30, 2007, Office Action mailed Jul. 28, 2010.
U.S. Appl. No. 11/742,280, filed Apr. 30, 2007, Response filed Nov. 29, 2010.
Yi, "Beamforming for MIMO systems with limited feedback," 2006 Iet International Conference on Wireless, Mobile and Multimedia Networks, Nov. 6-9, 2006 pp. 1-3.
PCT International Search Report and Written Opinion related to PCT/US2008/054355 dated Jun. 27, 2008.
Mondal, "Frame theoretic quantization for limited feedback MIMO beamforming systems" 2005 International Conference on Wireless Networks, Communications and Mobile Computing, vol. 2, Jun. 13-16, 2005 pp. 1065-1070 vol. 2.
Freescale, "Overview and Way forward on MIMO Precoding in DL EUTRA," R1-070220 Jan. 2006 3GPP TGS RAN WG1 Meeting #47bis, Sorrento, Italy.
Philips, "Comparison between MU-MIMO codebook-based channel reporting techniques for LTE downlink," R1-062483, Oct. 2006. 3GPP TGS RAN WG1 Meeting #46bis, Seoul.
Philips, "System-level simulation results for channel vector quantisation feedback for MU-MIMO," R1-063028, Nov. 2006. 3GPP, TGS RAN WG1 Meeting #47, Riga.
Philips, "Comparison of MU-MIMO Feedback Schemes with Multiple UW Receive Antennas," 3GG TSG RAN WG1 Meeting #47bis, Sorrento, Italy, Jan. 15-19, 2007, Tdoc R1-070346.

(56) References Cited

OTHER PUBLICATIONS

Alcatel, "Link-level results for multiuser eigenmode transmission with limited feedback;" R1-070318 3GG TSG RAN WG1 Meeting #47bis, Sorrento, Italy, Jan. 15-19, 2007, Tdoc R1-070318.

Alcatel-Lucent, Philips, "Dedicated Reference Signals for MU-MIMO Precoding in E-UTRA Downlink," TSG-RAN WG1 #48, St. Louis, Missouri, Feb. 12-16, 2007, R1-071069.

Freescale, "Scheme for MU-MIMO in DL EUTRA," R1-070608 (this is an update of R1-070223 and in the document the No. was R1-070223. The Examiner changed to 608), Jan. 2007, 3GPP TSG RAN WG1 Meeting #47bis, Sorrento, Italy.

Freescale, Efficient method for feedback reduction and feedback mechanism for precoded MIMO in EUTRA R1-070221 Jan. 2006 3GPP TGS RAN WG1 Meeting #47bis, Sorrento, Italy.

Freescale, "Aspects of SU/MU Switching and MU-MIMO in DL EUTRA," R1-070222 Jan. 2006 3GPP TGS RAN WG1 Meeting #47bis, Sorrento, Italy.

Freescale, "Scheme for MU-MIMO in DL EUTRA," R1-070223 Jan. 2006 3GPP TGS RAN WG1 Meeting #47bis, Sorrento, Italy.

U.S. Appl. No. 11/687,508, filed Mar. 16, 2007, Office Action dated Feb. 1, 2010.

U.S. Appl. No. 11/687,508, filed Mar. 16, 2007, Response filed May 3, 2010.

U.S. Appl. No. 11/687,508, filed Mar. 16, 2007, Supplemental Response filed May 17, 2010.

U.S. Appl. No. 11/687,508, filed Mar. 16, 2007, Notice of Allowance mailed May 28, 2010.

Freescale, "Scheme for MU-MIMO in DL EUTRA" R1-070608 (this is an update of R1-070223 and in the document the number was R1-070223. The Examiner changed to 608), Jan. 2007, 3GPP TGS RAN WG1 Meeting #47bis, Sorrento, Italy.

Freescale, "Overview and Way forward on MIMO Preceding in DL EUTRA" R1-070220 Jan. 2006 3GPP TGS RAN WG1 Meeting #47bis, Sorrento, Italy.

Freescale, "Efficient method for feedback reduction and feedback mechanism for precoded MIMO in EUTRA" R1-070221 Jan. 2006 3GPP TGS RAN WG1 Meeting #47bis, Sorrento, Italy.

Freescale, "Aspects of SU/MU Switching and MU-MIMO in DL EUTRA" R1-070222 Jan. 2006 3GPP TGS RAN WG1 Meeting #47bis, Sorrento, Italy.

Freescale, "Scheme for MU-MIMO in DL EUTRA" R1-070223 Jan. 2006 3GPP TGS RAN WG1 Meeting #47bis, Sorrento, Italy.

Philips, Comparison between MU-MIMO Codebook-based Channel Reporting Techniques for LTE Downlink, R1064283, Oct. 2006. 3GPP RAN WG1 Meeting #46bis, Seoul.

Alcatel, "Link-level results for multiuser eigenmode transmission with limited feedback;" R1-070318 3GG TSG RAN WG1Meeting #47bis, Sorrento, Italy, Jan. 15-19, 2007, Tdoc R1-070318.

Love, "Limited Feedback Precoding for Spatial Multiplexing Systems," Global Telecommunications Conference, 2003, GLOBECOM '03, IEEE vol. 4, Publication year 2003, pp. 1857-1861.

Love, "Limited Feedback Precoding for Spatial Multiplexing Systems Using Linear Receivers," Military Communications Conference, 2003, MILCOM 2003, IEEE vol. 1, Publication Year 2003, pp. 627-632.

Love, "Limited Feedback Unitary Precoding for Orthogonal Space-Time Block Codes," IEEE Transactions on Signal Processing, Publication date Jan. 2005, vol. 53, Issue 1, pp. 64-73.

Castro et al., "Adaptive Vector Quantization for Precoding Using Blind Channel Prediction in Frequency Selective MIMO Mobile Channels,".

Huang, "Multi-antenna Limited Feedback for Temporally-Correlated Channels: Feedback compression," in Proc. IEEE Global Telecommunication Conference, Nov. 2006.

U.S. Appl. No. 11/687,441, filed Jan. 25, 2005, Office Action mailed Apr. 1, 2010.

U.S. Appl. No. 11/687,441, filed Jan. 25, 2005, Response filed Jun. 22, 2010.

U.S. Appl. No. 11/687,441, filed Jan. 25, 2005, Office Action mailed Jul. 6, 2010.

U.S. Appl. No. 11/687,441, filed Jan. 25, 2005, Response filed Oct. 6, 2010.

U.S. Appl. No. 11/687,441, filed Jan. 25, 2005, Notice of Allowance mailed Oct. 19, 2010.

B. Banister et al., "A Simple Gradient Sign Algorithm for Transmit Antenna Weight Adaptation with Feedback," IEEE Transactions on Signal Processing, vol. 51, No, 5, May 2003.

K. Huang et al., "Limited Feedback for Temporally-Correlated Channels.sub.—Feedback Rate and Delay," Mar. or Jun. 2006.

K. Huang et al., "Markov models for multi-antenna limited feedback systems," ICASSP, Jun. 2006.

J.C. Rob et al., "An Efficient Feedback Method for MIMO Systems with Slowly Time-Varying Channels," IEEE Communications Society, WCNC 2004.

N. Wei et al., Tackling MIMO-OFDMA Feedback Load Through Feedback Encoding, Sep. 6-8, 2009, IEEE Explore, pp. 363-367.

U.S. Appl. No. 11/537,948, filed Oct. 2, 2006, Preliminary Amendment dated Nov. 27, 2006.

U.S. Appl. No. 11/537,948, filed Oct. 2, 2006, Office Action mailed Mar. 18, 2009.

U.S. Appl. No. 11/537,948, filed Oct. 2, 2006, Response to Office Action filed Jun. 18, 2009.

U.S. Appl. No. 11/537,948, filed Oct. 2, 2006, Office Action mailed Sep. 30, 2009.

U.S. Appl. No. 11/537,948, filed Oct. 2, 2006, Response to Office Action filed Dec. 29, 2009.

U.S. Appl. No. 11/537,948, filed Oct. 2, 2006, Office Action mailed May 15, 2010.

U.S. Appl. No. 11/537,948, filed Oct. 2, 2006, Response to Office Action mailed Jul. 15, 2010.

U.S. Appl. No. 11/537,948, filed Oct. 2, 2006, Office Action mailed Aug. 31, 2010.

U.S. Appl. No. 11/537,948, filed Oct. 2, 2006, Response to Office Action mailed Nov. 30, 2010.

K. Wong et al, "Performance Enhancement of Multiuser MIMO Wireless Communication Systems," IEEE Transactions on Communications, vol. 50, No. 12, Dec. 2002.

Wei et al., Tackling MIMO-OFDMA Feedback Load Through Feedback Encoding, IEEE Wireless Communication Systems, p. 363-367 (Sep. 6-8, 2009).

U.S. Appl. No. 11/535,679, filed Sep. 27, 2006, Office Action mailed Oct. 27, 2009.

U.S. Appl. No. 11/535,679, filed Sep. 27, 2006, Response filed Jan. 27, 2010.

U.S. Appl. No. 11/535,679, filed Sep. 27, 2006, Office Action mailed Apr. 30, 2010.

U.S. Appl. No. 11/535,679, filed Sep. 27, 2006, Response filed Jul. 30, 2010.

U.S. Appl. No. 11/535,679, filed Sep. 27, 2006, Examiner Interview Summary mailed Oct. 22, 2010.

U.S. Appl. No. 11/535,679, filed Sep. 27, 2006, Supplemental Response filed Oct. 22, 2010.

* cited by examiner

CHANNEL RANK UPDATES IN MULTIPLE-INPUT MULTIPLE-OUTPUT COMMUNICATION SYSTEMS

This application is a continuation of application Ser. No. 12/053,577, filed Mar. 22, 2008, now U.S. Pat. No. 7,978,623 which is incorporated herein by reference in its entirety.

BACKGROUND OF THE INVENTION

1. Field of the Invention

The present invention is directed in general to the field of information processing. In one aspect, the present invention relates to a system and method for transmitting channel rank feedback information from one or more user equipment devices.

2. Description of the Related Art

Wireless communication systems transmit and receive signals within a designated electromagnetic frequency spectrum, but capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed, such as Multiple Input Multiple Output (MIMO), which is a transmission method involving multiple transmit antennas and multiple receive antennas. Such wireless communication systems are increasingly used to distribute or "broadcast" audio and/or video signals (programs) to a number of recipients ("listeners" or "viewers") that belong to a large group. An example of such a wireless system is the 3GPP LTE (Long Term Evolution) system depicted in FIG. 1, which schematically illustrates the architecture of an LTE wireless communication system 1. As depicted, the broadcast server 28 communicates through an EPC 26 (Evolved Packet Core) which is connected to one or more access gateways (AGW) 22, 24 that control transceiver devices, 2, 4, 6, 8 which communicate with the end user devices 10-15. In the LTE architecture, the transceiver devices 2, 4, 6, 8 may be implemented with base transceiver stations (sometimes referred to herein as enhanced "Node-B" or "eNB" devices) which in turn are coupled to Radio Network Controllers or access gateway (AGW) devices 22, 24 which make up the UMTS radio access network (collectively referred to as the UMTS Terrestrial Radio Access Network (UTRAN)). Each transceiver device 2, 4, 6, 8 includes transmit and receive circuitry that is used to communicate directly with any mobile end user(s) 10-15 located in each transceiver device's respective cell region. Thus, transceiver device 2 includes a cell region 3 having one or more sectors in which one or more mobile end users 13, 14 are located. Similarly, transceiver device 4 includes a cell region 5 having one or more sectors in which one or more mobile end users 15 are located, transceiver device 6 includes a cell region 7 having one or more sectors in which one or more mobile end users 10, 11 are located, and transceiver device 8 includes a cell region 9 having one or more sectors in which one or more mobile end users 12 are located. With the LTE architecture, the eNBs 2, 4, 6, 8 are connected by an S1 interface to the EPC 26, where the S1 interface supports a many-to-many relation between AGWs 22, 24 and the eNBs 2, 4, 6, 8.

As will be appreciated, each transceiver device, e.g., eNB 2, in the wireless communication system 1 includes a transmit antenna array and communicates with a user equipment device device, e.g., user equipment (UE) 15, having a receive antenna array, where each antenna array includes one or more antennas. The wireless communication system 1 may be any type of wireless communication system, including but not limited to a MIMO system, SDMA system, CDMA system, SC-FDMA system, OFDMA system, OFDM system, etc. Of course, the user equipment devices, e.g., UE 15, can also transmit signals which are received by the Node-B, e.g., eNB 2. The signals communicated between transmitter 102 and user equipment device 104 can include voice, data, electronic mail, video, and other data, voice, and video signals.

Various transmission strategies require the Node-B to have some level of knowledge concerning the channel response between the Node-B and each user equipment device, and are often referred to as "closed-loop" systems. An example application of closed-loop systems which exploit channel-side information at the Node-B (transmitter) ("CSIT") are precoding systems, such as space division multiple access (SDMA), which use closed-loop systems to improve spectrum usage efficiency by applying precoding at the Node-B to take into account the transmission channel characteristics, thereby improving data rates and link reliability. SDMA based methods have been adopted in several current emerging standards such as IEEE 802.16 and the 3rd Generation Partnership Project (3GPP) Long Term Evolution (LTE) platform. With such precoding systems, CSIT can be used with a variety of communication techniques to operate on the transmit signal before transmitting from the transmit antenna array. For example, precoding techniques can provide a multi-mode beamformer function to optimally match the input signal on one side to the channel on the other side. In situations where channel conditions can be provided to the Node-B, closed loop methods, such as MIMO precoding, can be used. Precoding techniques may be used to decouple the transmit signal into orthogonal spatial stream/beams, and additionally may be used to send more power along the beams where the channel is strong, but less or no power along the weak, thus enhancing system performance by improving data rates and link reliability. In addition to multi-stream transmission and power allocation techniques, adaptive modulation and coding (AMC) techniques can use CSIT to operate on the transmit signal before transmission on the transmit array.

With conventional closed-loop MIMO systems, full broadband channel knowledge at the Node-B may be obtained by using uplink sounding techniques (e.g., with Time Division Duplexing (TDD) systems). Alternatively, channel feedback techniques can be used with MIMO systems (e.g., with TDD or Frequency Division Duplexing (FDD) systems) to feed back channel information to the Node-B.

In the current LTE standard, channel quality information (CQI), precoding matrix index (PMI) and rank (collectively called channel feedback information (CFI)) can be fed back from the UE to the Node-B using one of two channels. One of the channels is the physical uplink control channel (PUCCH); the other channel is the physical uplink shared channel (PUSCH). The Node-B interprets CQI/PMI feedback transmitted on each of these channels based on the rank feedback. However, the behavior with respect to rank is not specified for situations where CQI/PMI feedback information is being transmitted on both the PUCCH and the PUSCH channels. For example, at various times, the rank indicated for feedback information transmitted in the PUSCH channel may be different than the rank indicated for feedback information transmitted the PUCCH channel. Currently there is no methodology to specify the behavior of the UE and Node-B for situations where rank indicated for feedback information transmitted in the PUSCH channel is different than the rank indicated for feedback information transmitted the PUCCH channel.

Accordingly, an efficient feedback methodology is needed to provide channel feedback information to a Node-B using rank information. In particular there is a need for an improved system and method to specify the behavior of the UE and Node-B for situations where rank indicated for feedback information transmitted in the PUSCH channel is different than the rank indicated for feedback information transmitted the PUCCH channel. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
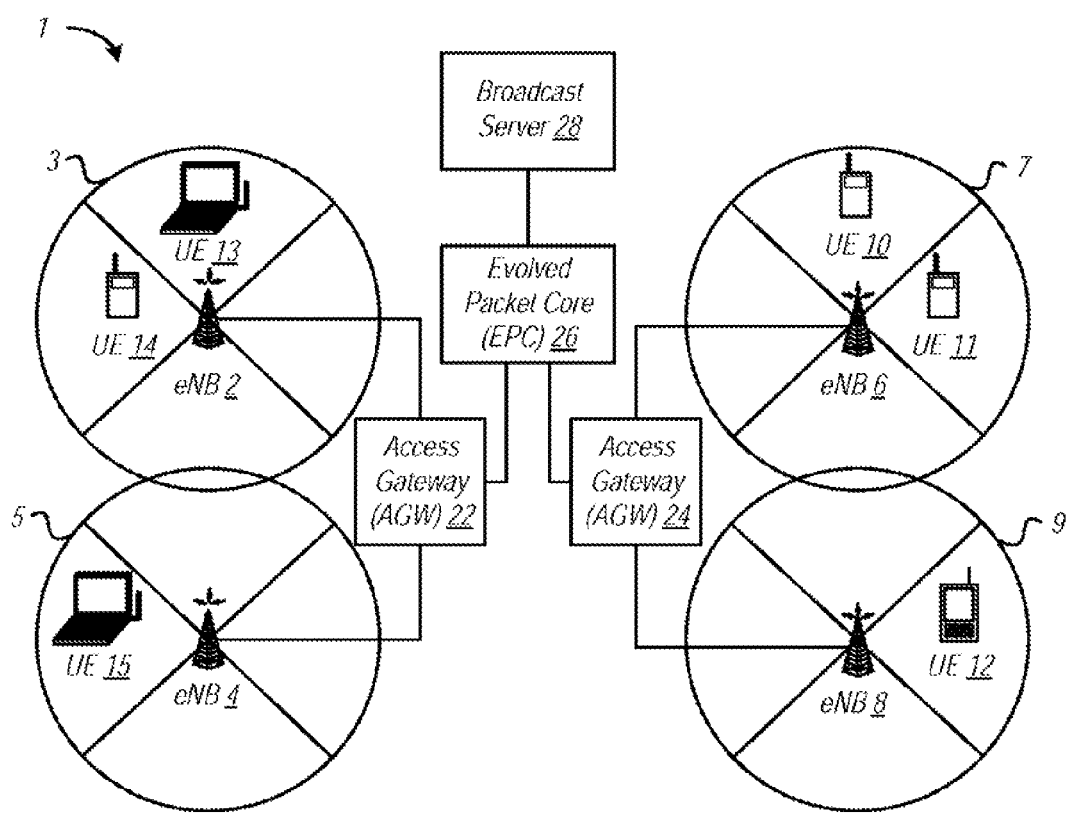
FIG. 1 schematically illustrates the architecture of an LTE wireless communication system.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

Embodiments of a system and methodology are disclosed for an efficient feedback methodology to provide channel feedback information to a Node-B using rank information. In particular, embodiments of the invention described herein provide an improved system and method to specify the behavior of the UE and Node-B for situations where rank indicated for feedback information transmitted in the PUSCH channel is different than the rank indicated for feedback information transmitted the PUCCH channel. In various embodiments of the invention as described herein, a channel rank feedback report from the user equipment device will be understood to constitute a request by the user equipment device to use a predetermined channel rank.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
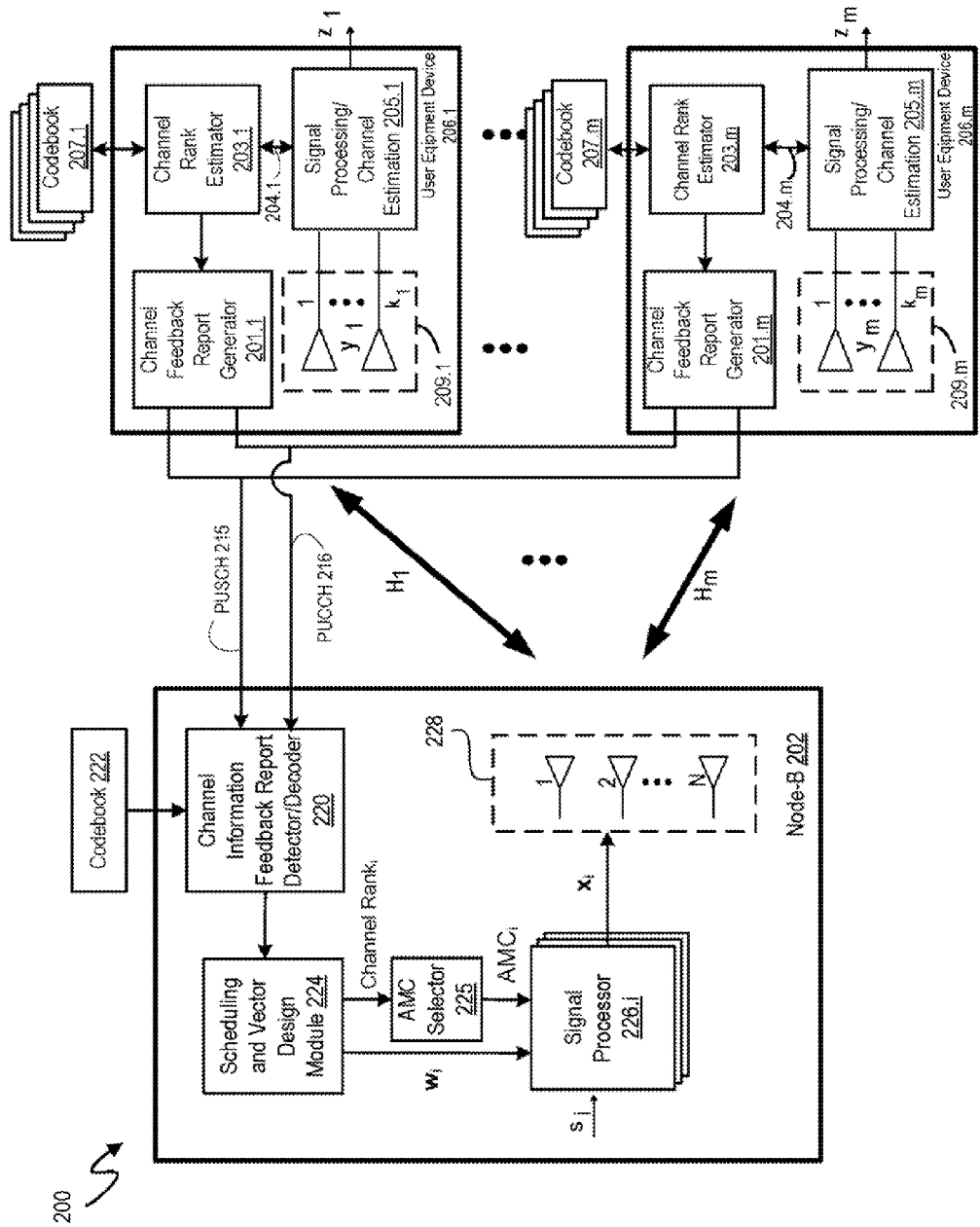
FIG. 2 depicts a wireless communication system in which one or more user equipment devices feed back information to a Node-B station for use in scheduling or otherwise precoding signal transmissions by the Node-B station.

FIG. 2 depicts a wireless communication system 200 in which a Node-B station 202 communicates with one or more user equipment devices 204.$i$. With reference to the LTE wireless system depicted in FIG. 1, the Node-B 202 may represent any of the control transceiver devices, 2, 4, 6, 8 which act as a base station, while the user equipment device 204.$i$ may represent any of the end user devices 10-15. In the system 200 depicted in FIG. 2, one or more user equipment devices 206.$i$ transmits channel feedback information, including channel rank, over PUSCH channel 215 and PUCCH channel 216 to a Node-B station 202 for use in scheduling or otherwise precoding signal transmissions by the Node-B station 202. At the Node-B 202, the channel feedback information is decoded and the rank is extracted and is used to configure or adapt one or more input signals that are transmitted from a Node-B 202 (e.g., a base station) to one or more user equipment devices 206.1-$m$ (e.g., subscriber stations). As will be appreciated, the Node-B station 202 and/or user equipment devices 206.$i$ include a processor, software executed by the processor, and other hardware that allow the processes used for communication and any other functions performed by the Node-B station 202 and each of user equipment devices 206.$i$. It will also be appreciated that the Node-B station 202 can both transmit signals (over the downlink path) and receive signals (over the uplink path), and that each user equipment device 204.$i$ can receive signals (over the downlink path) and transmit signals (over the uplink path).

The Node-B 202 includes an array 228 of one or more antennas for communicating with the user equipment devices 206.1 through 206.$m$, each of which includes an array 209.$i$ having one or more antennas for communicating with the Node-B 202. In operation, a data signal $s_i$ presented at the Node-B 202 for transmission to the user equipment device 204.$i$ is transformed by the signal processor 226.$i$ into a transmission signal, represented by the vector $x_i$. The signals transmitted from the transmit antenna 228 propagate through a matrix channel $H_i$ and are received by the receive antennas 209.$i$ where they are represented by the vector $y_i$. For a MIMO channel from the Node-B 202 to the $i^{th}$ user equipment device 206.$i$, the channel is denoted by $H_i$, $i \in \{1, 2, \ldots, m\}$. The channel matrix $H_i$, may be represented as $k_i \times N$ matrix of complex entries representing the complex coefficients of the transmission channel between each transmit-receive antenna pair, where N represents the number of transmit antennas in the transmit antenna array 228, and $k_i$ represents the number of antennas of the $i^{th}$ user equipment device 206.$i$. At the user equipment device 206.$i$, the signal processing unit 205.$i$ processes the $y_i$ signals received on the k antennas to obtain a data signal, $z_i$, which is an estimate of the transmitted data $s_i$. The processing of the received $y_i$ signals may include combining the $y_i$ signals with appropriate combining vector information $v_i$ retrieved from the codebook 207.$i$ or otherwise computed by the user equipment device's signal processing unit 205.$i$.

Precoding for downlink transmissions (Node-B to user equipment device) may be implemented by having each user equipment device 206.$i$ determine its MIMO channel matrix $H_i$—which specifies the profile of the transmission channel between a Node-B and an $i^{th}$ user equipment device—in the channel estimation signal processing unit 205.$i$. For example, in a MIMO implementation, each user equipment device 206.1-$m$ determines its MIMO channel matrix $H_i$ by using pilot estimation or sounding techniques to determine or estimate the coefficients of the channel matrix $H_i$. Each user equipment device 206.$i$ uses the estimated MIMO channel matrix or other channel-related information (which can be channel coefficients or channel statistics or their functions, such as a precoder, a beamforming vector or a modulation order) to generate precoding information, such as precoding and power allocation values, appropriate for the MIMO channel matrix. This may be done by using the channel-related information to access a precoder stored in the user equipment device codebook 207.$i$. In addition, each user equipment device 206.$i$ uses the estimated MIMO channel matrix or other channel-related information to generate channel rank information that is to be used to configure/adapt the signals transmitted by the Node-B.

In one embodiment, the channel rank report generator 201.$i$ may include logic and/or circuitry for detecting a change in the mode of operation of the user equipment device 206.$i$ (e.g., from a single-antenna mode of operation to a multi-antenna mode of operation) so that channel rank information is generated and reported to the Node-B 202 only when such a mode change is detected. The channel estimation/signal processing unit 205. is operable to monitor a downlink channel to obtain measurements of a plurality of channel parameters, including CQI, PMI and channel rank. A preferred rank is then selected for formatting CFI reports that are transmitted to the Node-B on a plurality of communication channels, e.g., a PUSCH and a PUCCH. In various embodiments of the invention, the CFI, including channel rank, may be fed back to the Node-B either at periodic time intervals or aperiodically. Furthermore, in various embodiments of the invention, the CFI, including channel rank, may be fed back to the Node-B in response to a request from the Node-B; or the CFI, including the channel rank, may be fed back to the Node-B autonomously by the user equipment device based on predetermined criteria.

Rather than feeding back the full channel rank representation, the user equipment device 206.$i$ may use a codebook 207.$i$ to compress or quantize the transmission profile (e.g., channel rank information) that is generated from the detected channel information and that can be used by the Node-B in controlling signal transmission to the user equipment device. The channel rank estimator 203.$i$ generates a quantization/codebook index by accessing the user equipment device codebook 207.$i$ which stores an indexed set of possible transmission profiles and/or channel matrices $H_i$ along with associated channel rank information so that the estimated channel matrix information 204.$i$ generated by the signal processing unit 205.$i$ can be used by the channel rank estimator 203.$i$ to retrieve a codebook index from the codebook 207.$i$. The output of the channel rank estimator 203.$i$ is provided to a channel rank report generator 201.$i$ that is operable to independently decide when to generate and feedback channel rank reports. For example, the channel rank report generator 201.$i$ may include a channel rank transition detector that detects a change in the channel rank information that meets a predetermined change threshold requirement so that channel rank information is generated and reported to the Node-B 202 via the feedback channel 215 only when the predetermined change threshold requirement is met. In another example, the channel rank report generator 201.$i$ may include logic and/or circuitry for detecting a change in the mode of operation of the user equipment device 206.$i$ (e.g., from a single-antenna mode of operation to a multi-antenna mode of operation) so that channel rank information is generated and reported to the Node-B 202 only when such a mode change is detected.

The channel feedback information is transmitted via the PUSCH channel 215 and the PUCCH channel 216 to the Node-B 202 where it may be stored and/or processed by the channel rank report detector/decoder 220. For example, a memory controller (not shown) in the channel rank report detector/decoder 220 may be used to update the previously reported channel rank information, either directly or using channel rank information retrieved from the codebook 222. In this way, the channel rank report detector/decoder 220 is operable to process the generated channel rank information to provide channel rank information that can be used by scheduling module 224 and AMC selection module 225 to generate scheduling or AMC information, respectively, for a particular user equipment device 206.$i$. As will be appreciated, the scheduling module 224 may be used to dynamically control which time/frequency resources are allocated to a certain user equipment device 206.$i$ at a given time. Downlink control signaling informs each user equipment device 206.$i$ what resources and respective transmission formats have been allocated. The scheduling module 224 can instantaneously choose the best multiplexing strategy from the available methods (e.g., frequency localized or frequency distributed transmission). The flexibility in selecting resource blocks and multiplexing users will influence the available scheduling performance.

In general, embodiments of the invention pertain to communication systems in which the user end device feeds back CFI, including CQI, PMI and rank, in at least two modes of feedback which may be over two logical channels. In some embodiments of the invention the channel rank reported on each of the channels is interdependent and in some embodiments the ranks are the same. In other embodiments of the invention, the channel rank reported on the two channels is independent and, therefore, the two channels can have different channel ranks.

For example in one embodiment, the first logical channel, e.g., the PUCCH, is configured to feed back wideband CFI to be used for scheduling down link control information while the second logical channel, e.g., the PUSCH, is configured to feed back frequency selective CFI to be used for scheduling down link data. In this case, the rank feedback on these two reports are configured to be independent.

In another embodiment, the first logical channel, e.g., the PUCCH, is configured to feed back frequency selective CFI of a first type which may be used for scheduling down link data information while the second logical channel, e.g., the PUSCH, is configured to feed back frequency selective CFI of a second type which may be used for scheduling down link data. In this case, the rank feedbacks of these two reports are configured to be dependent. In this embodiment, it is possible that the rank observed by the user equipment device in the first set of CFI is different than the rank observed in the second set of CFI, in which case the user equipment device will select rank observed in the first set of CFI or the second set of CFI to be used for CFI reports on both channels. In one embodiment, the user equipment device may select the lower of the ranks of the two CFI sets as the choice of rank for both the feedback CFI sets.

Figure 3:
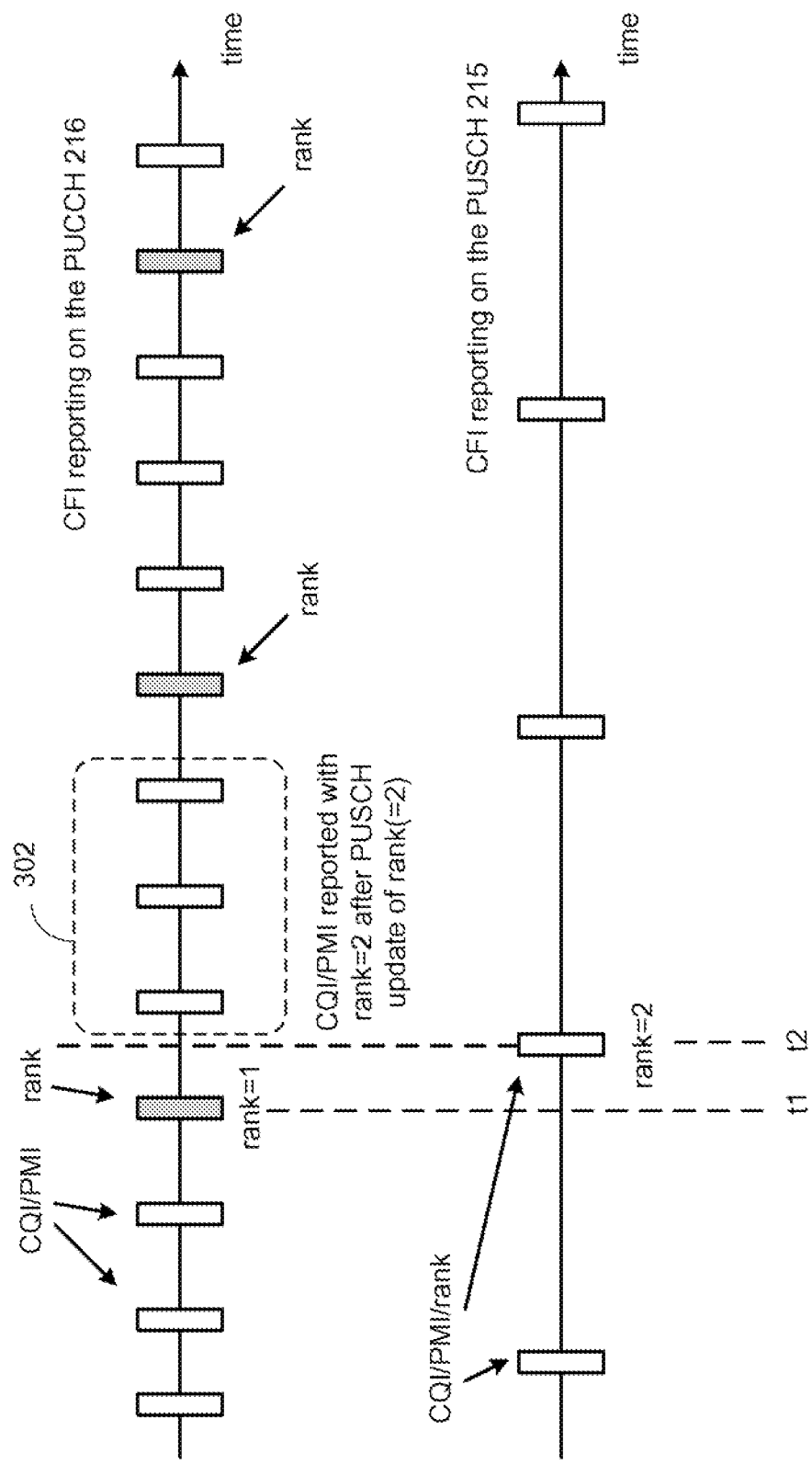
FIG. 3 is an illustration of the simultaneous transmission of channel feedback information on PUCCH and PUSCH channels in accordance with one embodiment of the invention.

FIG. 3 is an illustration of the simultaneous transmission of channel feedback information on a PUSCH channel 215 and a PUCCH channel 216 in accordance with one embodiment of the invention wherein the channel ranks on the two channels are dependent, i.e., set to be equal. The CFI transmitted on the PUCCH channel 216 is transmitted in a series of subframes with CQI and PMI information being transmitted together, with channel rank being transmitted in a separate subframe at predetermined intervals. For purposes of illustration, the CFI transmitted on the PUCCH channel 216 is shown to have a rank=1 at time t1. At time t2, however, the CFI transmitted on the PUSCH channel 215 is shown to have a rank=2. As will be understood by those of skill in the art, however, the current LTE standard does not provide a protocol for arbitrating between ranks when the rank is different for CFI transmitted on the PUSCH 215 and the PUCCH 216. In this embodiment of the invention, the rank reported on the two channels are interdependent on each other, i.e., at any time after a change in rank for either channel is detected, the ranks on the two CFI reporting modes on the PUSCH and PUCCH are identical. The user end device measures the rank for the two CFI reports and thereafter then the user end will choose a preferred rank to configure both the CFI reports. Thus, the latest preferred rank reported by CFI subframes either on the PUSCH or the PUCCH is used to interpret the CQI/PMI report on the PUCCH. Therefore, in this embodiment of the invention, the subsequently transmitted subframes 302 are processed using a rank=2.

To ensure reliability of the rank report on the PUCCH 216, the rank reported on the PUSCH 215 should be nearly as reliable or more reliable than the rank reported on the PUCCH 216. Also, since the rank and CQI/PMI reports are made on the same subframe on the PUSCH channel 215, the rank reported on the PUSCH 215 should be used to interpret the CQI/PMI on the PUSCH 215.

Figure 4:
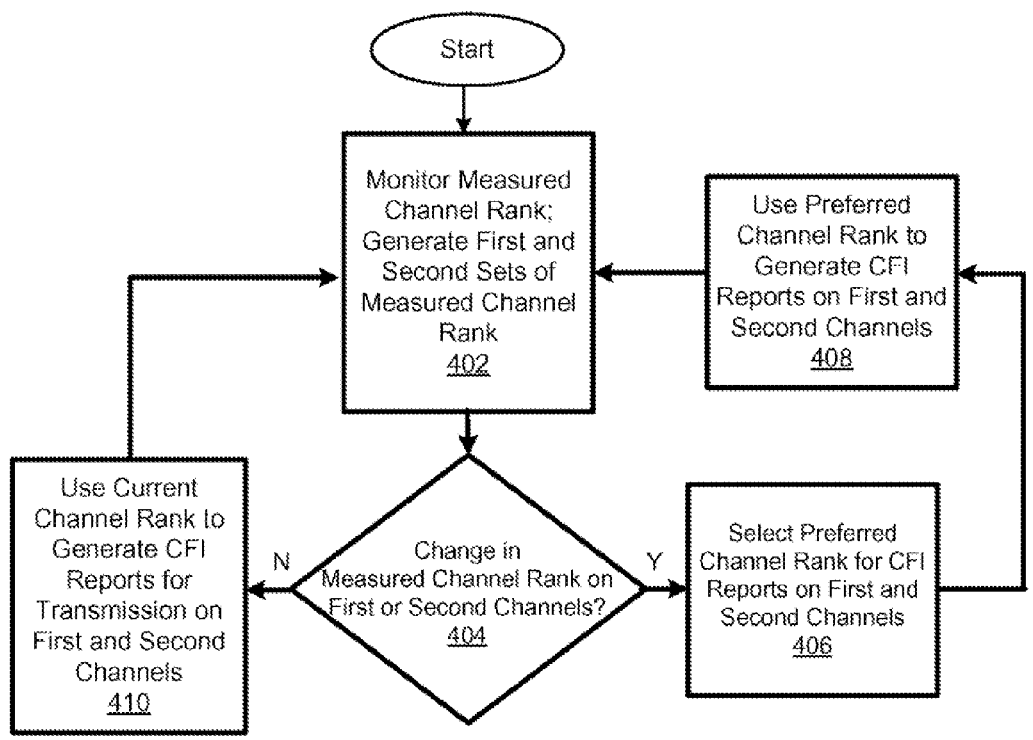
FIG. 4 is a flowchart illustration of processing steps for providing channel rank feedback information on first and second transmission channels wherein the channel ranks on the two channels are dependent.

FIG. 4 is a flowchart illustration of processing steps for providing channel rank feedback information on first and second transmission channels wherein the preferred channel ranks on the two channels are dependent. In step 402, the channel rank on a down link channel is monitored to generate first and second sets of measured channel rank. In step 404 a test is conducted to determine whether there has been a change in the measured channel rank of either of the first and second sets of measured channel rank. If the result of the test conducted in step 404 indicates that either of the measured channel ranks has changed, processing proceeds to step 406 wherein processing logic selects a preferred channel rank for formatting CFI reports on the first and second channels. Processing then proceeds to step 408, wherein the preferred channel rank is used to select the format for CFI reports transmitted on the first and second communication channels. Referring again to step 404, if the result of the test conducted in step 404 indicates that there is no change in the measured channel rank on the first and second channels, processing proceeds to step 410 wherein the current rank is used to select the format for CFI reports transmitted on the first and second transmission channels.

In some embodiments of the invention, rank updates on the two channels may be independent of each other, i.e., the rank reported on the PUSCH may be different than the rank reported on the PUCCH—this allows different CFI feedbacks to co-exist on the two channels. As an example, if the PUCCH has wideband CFI feedback and the PUSCH has user equipment device-selected CFI feedback, then the ranks for these two cases can be different. This implies that the rank reported on the PUSCH does not affect the CQI/PMI reported on the PUCCH; likewise the rank reported on the PUCCH does not affect the CQI/PMI reported on the PUSCH.

Figure 5:
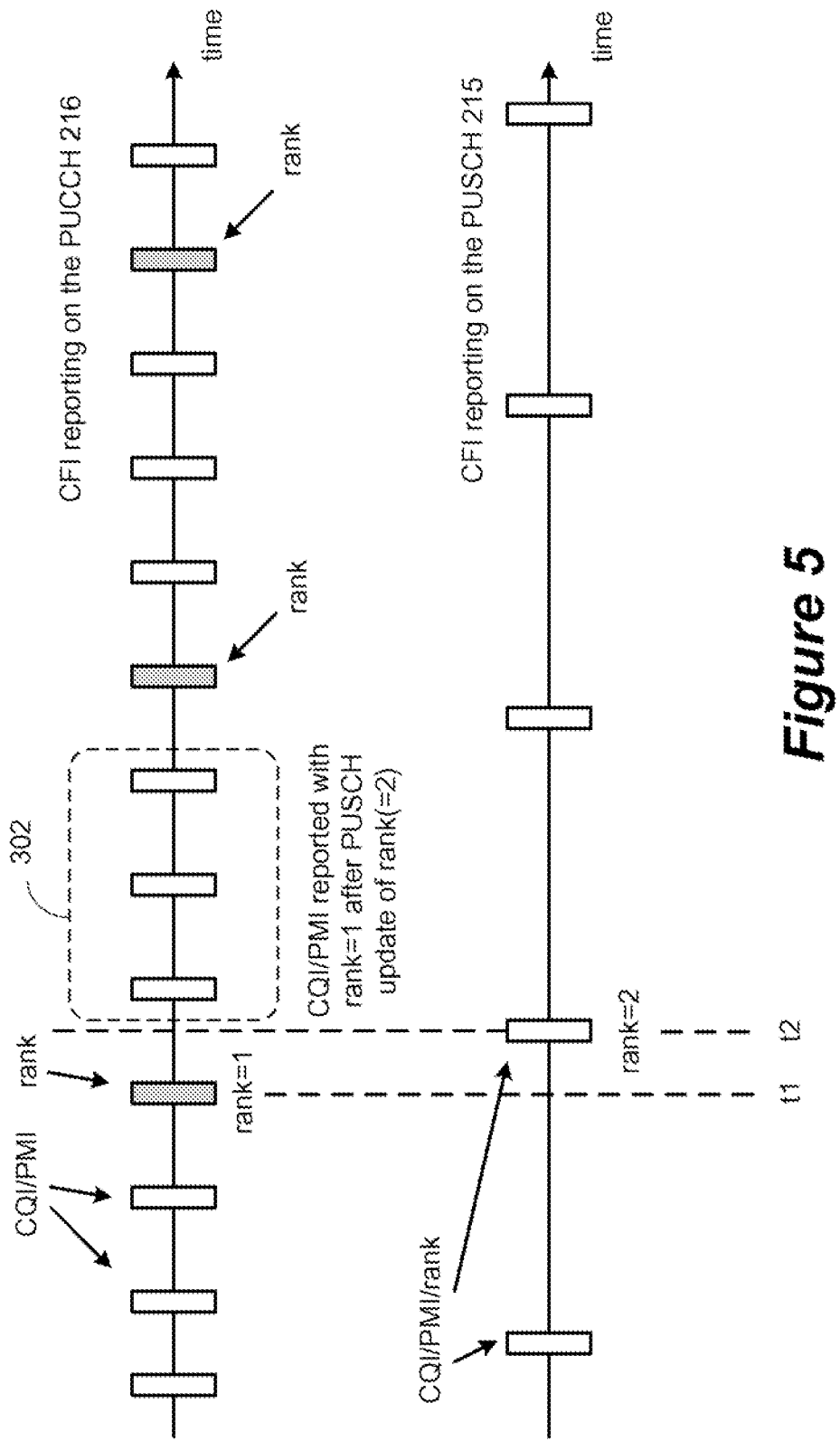
FIG. 5 is an illustration of the simultaneous transmission of channel feedback information on PUCCH and PUSCH channels in accordance with an alternate embodiment of the invention.

FIG. 5 is an illustration of the simultaneous transmission of channel feedback information on PUCCH and PUSCH channels in accordance with an alternate embodiment of the invention wherein the channel ranks for the two channels are independent. Again, for purposes of illustration, the CFI transmitted on the PUCCH channel 216 is shown to have a rank=1 at time t1. At time t2, however, the CFI transmitted on the PUSCH channel 215 is shown to have a rank=2. In this embodiment of the invention, ranks reported on the two channels are not dependent on each other, i.e., at any instant of time, the rank on the two CFI reporting modes on the PUSCH and PUCCH may not be identical. Thus, the latest rank reported by CFI subframes on the PUSCH is used to interpret the CQI/PMI report on the PUSCH and the latest rank reported by CFI subframes on the PUCCH is used is used to interpret the CQI/PMI report on the PUCCH. Therefore, in this embodiment of the invention, the subsequently transmitted subframes 302 are processed using a rank=1.

Figure 6:
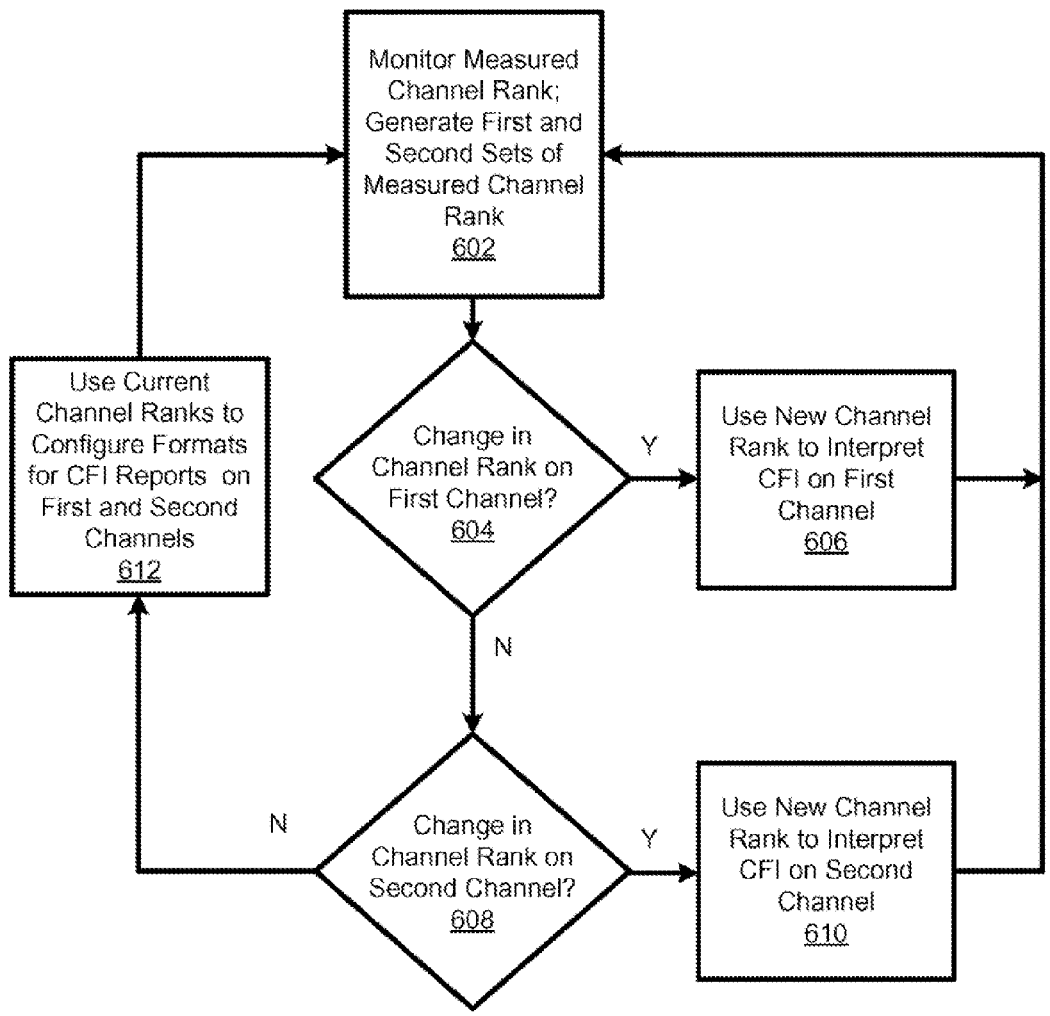
FIG. 6 is a flowchart illustration of processing steps for providing channel rank feedback information on first and second transmission channels wherein the channel ranks on the two channels are independent.

FIG. 6 is a flowchart illustration of processing steps for providing channel rank feedback information on first and second transmission channels wherein the channel ranks on the two channels are independent. In step 602, the measured channel rank on a downlink channel is monitored and first and second sets of measured channel rank are generated therefrom. In step 604 a test is conducted to determine whether there has been a change in the measured channel rank on the first set of measured channel rank. If the measured channel rank on the first channel rank has changed, processing proceeds to step 606 and a new channel rank is used to select the format for CFI reports transmitted on the first communication. If, however, the test conducted in step 604 indicates that the measured channel rank on the first channel has not changed, processing proceeds to step 608 where a test is conducted to determine whether there has been a change in the measured channel rank of the second channel. If the measured channel rank on the second channel has changed, processing proceeds to step 610 and a new channel rank is used to select the format for transmitting CFI reports on the second channel communication channel. If, however, the test conducted in step 608 indicates that the measured channel rank on the second channel has not changed, processing proceeds to step 612 where the current channel ranks for the first and second channels are used to select formats for transmitting CFI reports on the first and second channels, respectively.

In another alternate embodiment, CFI is interpreted using channel ranks that are dependent (i.e., the same) during some reporting time intervals and are independent (i.e., not forced to be the same) in other reporting time intervals. For example in a first reporting time interval, T1, the PUCCH can be configured for wideband CFI (to be used for scheduling down link control channel), while the PUSCH is configured for frequency selective CFI (to be used for scheduling down link data). During this reporting time interval, T1, channel ranks are independent. In another reporting time interval, e.g., T2, the PUCCH may be configured for frequency selective CFI (e.g., type 1, to be used for scheduling a down link data channel) while the PUSCH may be configured for frequency selective CFI (e.g., type 2, to be used for scheduling down link data). During this reporting time interval, T2, channel ranks are dependent. In this alternate embodiment, the Node B can semi-statically (over a plurality of predetermined reporting time intervals) configure the CFI reporting to work in the dependent or independent modes. In an alternate embodiment, the CFI reporting can be chosen to work in the dependent or independent modes as a function of the combination of the two CFI reporting types. For example, a parameter table may be established a priori by the user equipment device and the Node-B to provide parameters that specify the CFI reporting mode, i.e., dependent or independent mode, based on the combination of CFI reporting types. The exact reporting mode used during a predetermined time interval will then depend on the CFI reporting types over the two channels configured by the Node-B.

By now it should be appreciated that there has been disclosed a system and method for providing channel feedback information to a Node-B using rank information. In one aspect of the invention, a method comprises: receiving a first set channel feedback information (CFI), including a first rank report, from a user equipment device on a first communication channel; receiving a second set of CFI, including a second rank report, from the user equipment device on a second communication channel; comparing the first and second rank reports to determine the most recent rank report; and using the most recent rank report to interpret CFI reports. In an embodiment of the invention, the first set of CFI is transmitted on a physical uplink shared channel (PUSCH). In another embodiment of the invention, the second communication channel is a physical uplink control channel (PUCCH).

In another aspect of the invention the method comprises: receiving a first set of CFI, including a first rank report, from a user equipment device on a first communication channel; receiving a second set of CFI, including a second rank report, from the user equipment device on a second communication channel; using the first rank report to interpret the CFI transmitted using the first communication channel; and using the second rank report to interpret the CFI transmitted using the second communication channel.

In yet another aspect of the invention, a base station transceiver is provided, wherein the base station transceiver comprises: a channel feedback information report decoder operable to receive a first CFI report, including a first rank report, from a user equipment device on a first communication channel, to receive a second set of CFI, including a second rank report, from the user equipment device on a second communication channel, and further operable to compare the first and second rank reports to determine the most recent rank report; and processing logic operable to use the most recent rank report to interpret CFI reports.

In yet another aspect of the invention a base station transceiver is provided, wherein the transceiver comprises: a channel feedback information report decoder operable to receive a first CFI report, including a first rank report, from a user equipment device on a first communication channel, to receive a second set of CFI, including a second rank report, from the user equipment device on a second communication channel, and processing logic operable to use the first rank report to interpret the CFI transmitted using the first communication channel and use the second rank report to interpret the CFI transmitted using the second communication channel.

The methods and systems for an efficient feedback methodology to provide channel feedback information to a Node-B using rank information, as shown and described herein, may be implemented in software stored on a computer-readable medium and executed as a computer program on a general purpose or special purpose computer to perform certain tasks. For a hardware implementation, the elements used to perform various signal processing steps at the Node-B (e.g., coding and modulating the data, precoding the modulated signals, preconditioning the precoded signals, extracting channel rank reports from the uplink messages and so on) and/or at the receiver (e.g., recovering the transmitted signals, demodulating and decoding the recovered signals, detecting changes in the user equipment device state that require feedback of channel-side information and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof In addition or in the alternative, a software implementation may be used, whereby some or all of the signal processing steps at each of the Node-B and user equipment device may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various feedback systems and methods for using same, the present invention is not necessarily limited to the example embodiments illustrated herein. For example, various embodiments of a channel rank feedback system and methodology disclosed herein may be implemented in connection with various proprietary or wireless communication standards, such as IEEE 802.16e, 3GPP-LTE, DVB and other multi-user systems, such as wireless MIMO systems, though channel rank information can also be used in non-MIMO communication systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for processing signals in a communication system comprising a base station and one or more user equipment devices, the method comprising:
   receiving a first set of channel feedback information (CFI), including a first rank report, from a user equipment device on a first communication channel;
   receiving a second set of CFI, including a second rank report, from said user equipment device on a second communication channel; and
   wherein, during a reporting time interval, said first and second rank reports are independent and said first rank report is used to interpret CFI data transmitted on the first communication channel and said second rank report is used to interpret CFI transmitted on the second communication channel.

2. A method for processing signals in a communication system comprising a base station and one or more user equipment devices, the method comprising:
   receiving a first set of channel feedback information (CFI), according to a first scheduling mode, including a first rank report, from a user equipment device on a first communication channel;
   receiving a second set of CFI, according to a second scheduling mode, including a second rank report, from said user equipment device on a second communication channel; and
   wherein, during a reporting time interval, said first and second rank reports are independent and said first rank report is used to interpret CFI data transmitted on the first communication channel and said second rank report is used to interpret CFI transmitted on the second communication channel.

3. A method for processing signals in a communication system comprising a base station and one or more user equipment devices, the method comprising:
   receiving a first set of channel feedback information (CFI), comprising a frequency selective CFI of a first type, including a first rank report, from a user equipment device on a first communication channel;
   receiving a second set of CFI, comprising a frequency-selective CFI of a second type, including a second rank report, from said user equipment device on a second communication channel; and
   wherein, during a reporting time interval, said first and second rank reports are independent and said first rank report is used to interpret CFI data transmitted on the first communication channel and said second rank report is used to interpret CFI transmitted on the second communication channel.

4. The method of claim 1, wherein the first channel comprises a physical uplink control channel (PUCCH), and the second channel comprises a physical uplink shared channel (PUSCH).

5. The method of claim 4, wherein the first and second sets of CFI comprise frequency-selective reports.

6. The method of claim 4, wherein the first and second sets of CFI comprise wideband reports.

7. The method of claim 4, wherein the first set of CFI comprises a wideband report, and the second set of CFI comprises a frequency-selective report.

8. The method of claim 7, wherein the base station schedules a downlink control resource based at least in part on the first set of CFI.

9. The method of claim 7, wherein the base station schedules a downlink data resource based at least in part on the second set of CFI.

10. The method of claim 4, wherein the first set of CFI comprises a periodic report, and the second set of CFI comprises an aperiodic report.

11. The method of claim 1, wherein:
   the first set of CFI is processed based at least in part on the first rank report; and
   the second set of CFI is processed based at least in part on the second rank report.

12. The method of claim 1, wherein the base station specifies a CFI reporting mode.

13. The method of claim 2, wherein the first channel comprises a physical uplink control channel (PUCCH) and the second channel comprises a physical uplink shared channel (PUSCH).

14. The method of claim 13, wherein the first set of CFI comprises a periodic report, and the second set of CFI comprises an aperiodic report.

15. The method of claim 14, wherein:
   the first set of CFI is processed based at least in part on the first rank report; and
   the second set of CFI is processed based at least in part on the second rank report.

16. The method of claim 3, wherein the first channel comprises a physical uplink control channel (PUCCH) and the second channel comprises a physical uplink shared channel (PUSCH); and
   wherein the first set of CFI comprises a periodic report and the second set of CFI comprises an aperiodic report.

17. A user equipment device comprising:
   a channel feedback report generator operable to generate a first set of measured channel feedback information (CFI), including a first measured rank, and a second set of measured CFI, including a second measured rank;
   processing logic operable to use the first measured rank process a first CFI report and the second measured rank to process a second CFI report; and
   transmission circuitry operable to transmit the first CFI report on a first communication channel, and to transmit the second CFI report on a second communication channel;
   wherein the first and second measured rank are independent of each other.

18. The user equipment device of claim 17, wherein the first channel comprises a physical uplink control channel (PUCCH) and the second channel comprises a physical uplink shared channel (PUSCH).

19. The user equipment device of claim 18, wherein the first set of CFI comprises a wideband report and the second set of CFI comprises an frequency-selective report.

20. The user equipment device of claim 18, wherein the first and second sets of CFI comprise wideband reports.

21. The user equipment device of claim 18, wherein the first set of CFI comprises a periodic report and the second set of CFI comprises an aperiodic report.

22. A user equipment device comprising:
   a feedback report generator comprising:
   measurement circuitry to determine a first group of channel feedback information (CFI) report including a first measured rank, and determine a second group of CFI including a second measured rank;
   report processing logic configured to
      process the first group of CFI based at least in part on the first measured rank to produce a first CFI report; and
      process the second group of CFI based at least in part on the second measured rank to produce a second CFI report; and transmission circuitry operable to transmit the first CFI report on a first communication channel, and to transmit the second CFI report on a second communication channel;

wherein the second measured rank is invalid for interpretation of the first CFI report.

23. The user equipment device of claim 22, wherein the first channel comprises a physical uplink control channel (PUCCH), and the second channel comprises a physical uplink shared channel (PUSCH).

24. The user equipment device of claim 23, wherein the first CFI report comprises a periodic report, and the second CFI report comprises an aperiodic report.

25. The user equipment device of claim 22, wherein a base station schedules a downlink control resource based at least in part on the first CFI report.

26. A base station apparatus comprising:
transmission circuitry operable to:
receive a first set of channel feedback information (CFI), including a first rank report, from a user equipment device on a first communication channel;
receive a second set of CFI, including a second rank report, from the user equipment device on a second communication channel; and wherein the first and second rank reports are independent, and the first rank report is used to interpret CFI data transmitted on the first communication channel, and the second rank report is used to interpret CFI transmitted on the second communication channel.

27. The base station apparatus of claim 26, wherein the first channel comprises a physical uplink control channel (PUCCH), and the second channel comprises a physical uplink shared channel (PUSCH).

28. The base station apparatus of claim 27, wherein the first set of CFI comprise a periodic report, and the second set of CFI comprise an aperiodic report.

29. The base station apparatus of claim 27, wherein the base station schedules a downlink control resource based at least in part on the first set of CFI.

30. The base station apparatus of claim 27, wherein the base station schedules a downlink data resource based at least in part on the second set of CFI.

31. The base station apparatus of claim 26, wherein the base station specifies a CFI reporting mode.

* * * * *

UNITED STATES PATENT AND TRADEMARK OFFICE
CERTIFICATE OF CORRECTION

PATENT NO. : 8,626,222 B2
APPLICATION NO. : 12/891160
DATED : January 7, 2014
INVENTOR(S) : Jayesh H. Kotecha et al.

Page 1 of 1

It is certified that error appears in the above-identified patent and that said Letters Patent is hereby corrected as shown below:

In the Claims:

Claim 22, Column 12, Line 58, please delete "report".

Signed and Sealed this
Third Day of May, 2016

Michelle K. Lee
*Director of the United States Patent and Trademark Office*